Figure 1:
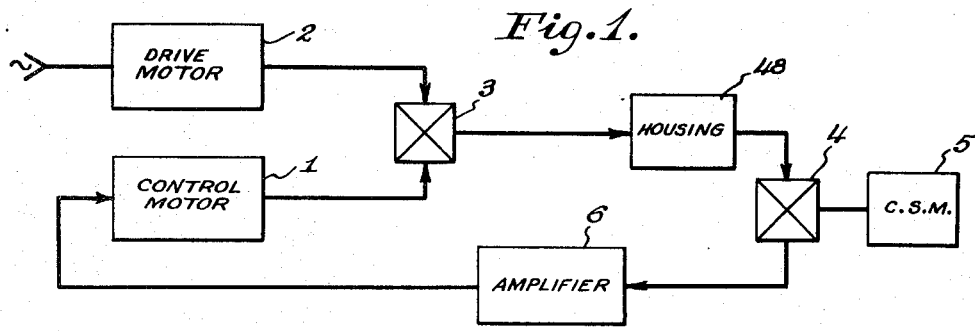

Oct. 26, 1965 G. J. WATT 3,214,659
CONSTANT SPEED CONTROL SYSTEM
Filed Feb. 5, 1952

INVENTOR
GORDON J. WATT
BY
ATTORNEY

United States Patent Office 3,214,659
Patented Oct. 26, 1965

3,214,659
CONSTANT SPEED CONTROL SYSTEM
Gordon J. Watt, Uniondale, N.Y., assignor to Sperry Rand Corporation, a corporation of Delaware
Filed Feb. 5, 1952, Ser. No. 270,063
4 Claims. (Cl. 318—8)

This invention relates to servo motor systems and particularly to such systems when applied to rotate a driven object at constant speed even though there is high frictional loading in the system and despite the existence of disturbing velocity and acceleration forces acting on the driven object.

In copending application S.N. 248,618, filed in the name of Lennox F. Beach on September 27, 1951, there is disclosed a passive bearing finder adapted for use on submarines. In such system, an infra-red detecting device is arranged in a housing fixed to the top of a submarine periscope and the infra-red detecting elements are actuated in a manner to search the field of view of the periscope optics or to scan any selected portion thereof. In a modification of such a system, the housing is required to rotate independently of the periscope so that the entire horizon may be searched or scanned at constant speed by the passive bearing finder, and the bearing of the infra-red line of sight is presented on a suitable indicating device relative to the bearing of the submarine.

In the latter arrangement, the fact that the system is used to obtain accurate target bearing data relative to a submarine places unusual requirements on the driving mechanism that is employed to rotate the passive bearing finder housing. For example, since the equipment is underwater when the submarine is submerged, it is essential to have a watertight, rotating seal between the housing and the periscope on which it is mounted. Since such a hydraulic seal is usually in the form of tightly fitting sliding parts, it imposes a large static friction load on the drive motor. Furthermore, since there is always a certain amount of salt water leakage, despite the efficiency of the hydraulic seal, the driving mechanism and motive means must be immersed in oil to prevent corrosion. This condition introduces a high viscous drag in the system. It is also required that the driving means be arranged in such a manner that it cannot interfere with the periscope optical system. Thus, no element of the driving means can extend into the periscope tube, but the entire assembly must be made as small as possible to fit in the extremely limited space available in the bearing finder housing. In addition, since the housing must be positioned with a high degree of accuracy during searching and sector scanning operations, in accordance with control signals generated in a programming mechanism, high acceleration loads are imposed on the system. Finally, the driving mechanism must cancel all spurious motions imparted to the housing through the periscope tube. These motions include velocity and acceleration terms and are caused by a change of bearing of the submarine and by independent manual training of the periscope.

Under the conditions enumerated above, the driving mechanism for the housing is subject to large velocity errors because of the viscous torque and static friction effects. In addition, acceleration requirements are high during sector scan operation. Although the required motion of the housing could be obtained in a number of ways, most conventional servo systems far exceed the size and weight requirements within which the system of the present invention may be designed to operate. For example, it can be shown that a single motor giving an equivalent performance to that of the system described below would be prohibitive in size. A servo amplifier to operate such a motor would have several times the power dissipation of the one required herein. Two such motors operated in series would not have the acceleration response of the present system.

To satisfy the above requirements, the servo motor system of the present invention employs two small motors, in what may be termed a parallel arrangement, to drive the housing. In the preferred embodiment, one of these motors is operated substantially at constant speed to drive one input of a differential, the output of which is connected to rotate the housing. The other input of the differential is connected to the second or control motor and serves to rotate its rotor against the viscous drag of the oil in which it is immersed, while the housing is actuated at the desired speed, whereby the available acceleration torque of the system is substantially increased. The rotational speed of the housing is then compared with the rotational speed of a reference device and, in the event that there is a difference in these speeds, a proportional error signal is generated which is used to vary the speed and direction of rotation of the control motor to eliminate the error.

The principal object of this invention is to rotate a driven object at constant speed despite the effect of high frictional forces and disturbing acceleration and velocity forces acting on the object. Further objects of the invention are to decrease the size and control power requirements of the motive means needed to obtain constant speed operation of a driven object; to obtain higher rates of acceleration than may be had with conventional servo motor drives using comparable motive means; to extend the speed-torque range of the system; to eliminate velocity error during steady-state operation; to decrease the time lag of the system when the direction of rotation of the driven object is reversed during scanning operations; to permit standby operation of the control motor during most of the operating time of the system, whereby larger amounts of power may be demanded intermittently.

Figure 2:
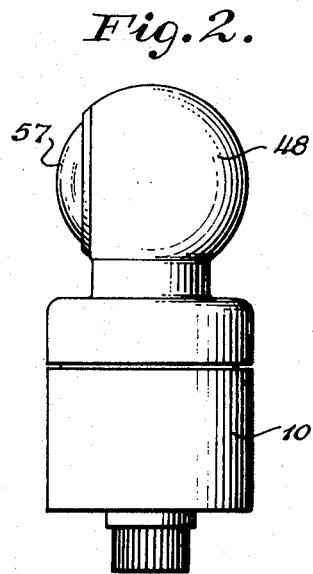

A preferred form of the invention is shown in the accompanying drawings, in which,
FIG. 1 is a circuit diagram of the invention;
FIG. 2 illustrates a typical application of the invention; and,
FIGS. 3 and 4 are sets of speed-torque curves.

Figure 3:
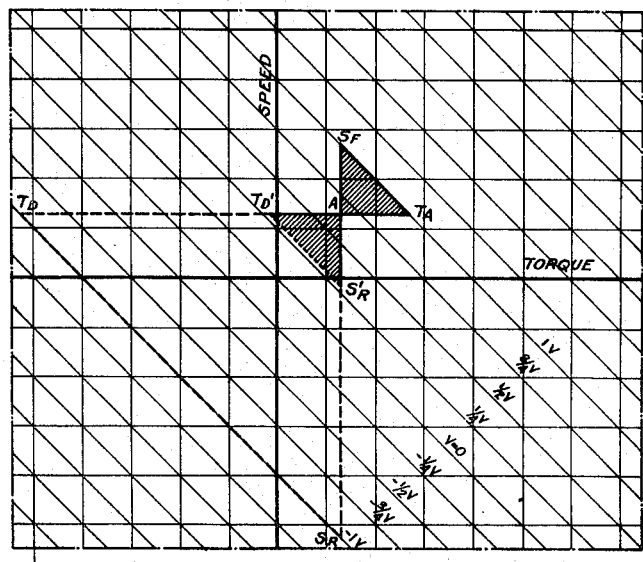
Figure 4:
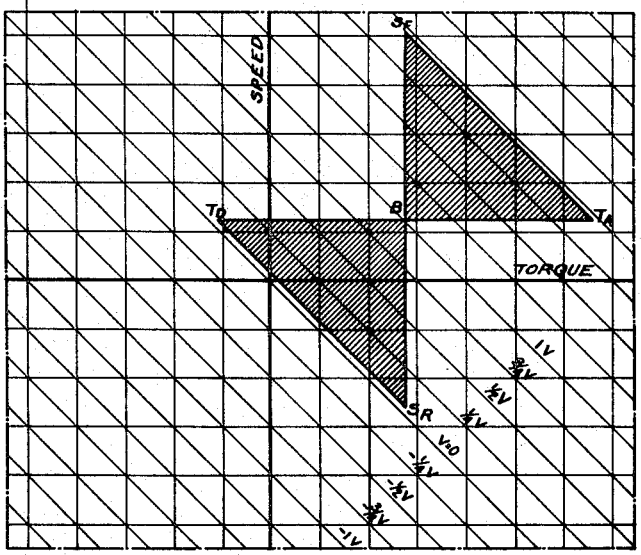

Before discussing the actual embodiment of this invention it is preferred to consider briefly the theory on which it is based with reference to FIGS. 3 and 4. The curves of these figures are speed-torque curves for two-phase induction motors with viscous drag, and are drawn for control voltages ranging from full voltage in one direction to full voltage in the opposite direction.

In order to have useful accelerating torque, it is inherent that in a single motor servo system the motor must be operated with less than full voltage, yet enough to maintain the desired speed of the driven object. Thus, the required torque and speed for a conventional single motor may be determined, for example, by a point A (see FIG. 3) which is substantially five-eighths of its full voltage. The accelerating torque available when operating at point A is limited by the full voltage values and is small in one direction, that is, the accelerating torque exerted in the direction of rotation of the driven object is limited by point $T_A$, and the decelerating torque is limited by the point $T_D$. However, since a servo system is usually designed to be controllable symmetrically about its normal steady-state operating point, the smaller value determines the practical limit of such torques, and the motor would actually be controllable only over the range from $T_A$ to $T_D'$. Similarly, if speed changes are required while maintaining constant torque, the practical range of forward and reverse speed control is limited by points $S_F$ and $S_R'$. Inasmuch as most of the requirements imposed on a servo system require combinations of changes in torque as well as speed, the practical operating limits of the system are defined by the triangles $AT_AS_F$ and $AT_D'S_R'$. This is the conventional relationship when a single driving motor is employed.

Should a system be arranged in which a single motor is operated at full voltage, it would normally be impractical for servo purposes because accelerating torque is available only in one direction. However, if this motor is arranged to rotate the driven object in parallel with a second motor by means of a differential device, a different relationship is obtained. In the latter case, if no control voltage is applied to the second motor, the torque output of the first motor is effective to rotate the driven object as required and, at the same time, to rotate the second motor backward. In this manner the second motor exercises a braking action on the first motor, but since its control windings are unenergized, the entire torque that may be produced by the second motor is available to add to or subtract from the torque available from the first motor in accordance with variations in load in the driven object.

If two motors, electrically identical to that mentioned in connection with FIG. 3, are arranged in parallel to rotate a driven object through a differential, the resulting speed-torque relationship is as shown in FIG. 4. As a matter of practice, these motors are selected such that when the first or drive motor is operating at full voltage and the second or control motor is unenergized but is being turned backward against the viscous drag of the oil in which it is immersed, the torque and speed output is defined by point B of FIG. 4. By this arrangement it is apparent that the full range of control voltage may be applied to the second motor to add to or subtract from the torque available from the first motor. Thus, if speed is held constant, the combined torque output may be increased to point $T_A$ or decreased to point $T_D$. Similarly, if torque is held constant, the combined speed output may be increased to point $S_F$ or decreased to point $S_R$. As a result, the practical operating limits of this system are defined by the triangles $BT_AS_F$ and $BT_DS_R$.

Comparing FIGS. 3 and 4 it is apparent that two motors arranged as described provide substantially more than double the torque and speed control that is available in the conventional single motor arrangement. Obviously, this comparison is valid regardless of the size of the motors. Thus, it follows that two motors so arranged, each of which is electrically equivalent to half the rating of a given motor, can produce a substantially improved servo motor system than can the given motor.

The foregoing concept forms the basis of the present invention and a typical application thereof is shown in FIG. 2, in which the object to be driven at constant speed comprises a housing 48 that contains a system of infra-red reflecting and detecting means which may be similar to that disclosed in the above mentioned application S.N. 248,618. The housing is provided with a window 57 to admit infra-red radiations, and is rotatably mounted on a servo motor drive unit 10 which is fixed at the upper end of a periscope tube (not shown). A suitable hydraulic seal provides a rotatable watertight connection between the housing and the drive unit.

The servo motor unit comprises a reversible control motor 1 and a unidirectional drive motor 2 each connected to an input of a mechanical differential device 3. The output of the differential is arranged, through suitable gearing, to rotate housing 48. Each of the motors 1 and 2 is a two-phase induction motor of substantially the same size, and the motor and differential assembly is completely immersed in oil to provide adequate lubrication and to prevent corrosion that may be caused by sea water that leaks into the assembly. The immersion of the control motor 1 in oil constitutes a means providing viscous drag for the rotor thereof.

In this arrangement drive motor 2 is operated at full voltage from a constant voltage source, and is so selected that during steady-state operation it is effective to rotate housing 48 at its required speed and, at the same time, to turn the rotor of control motor 1 backward against the viscous drag of the oil in which it is immersed.

To maintain an accurate check on the speed of the housing, a suitable selsyn transmission system is geared thereto and its output is fed to a differential selsyn 4 which has its other input suitably connected to a constant speed reference motor 5. As long as the housing is rotating at the proper speed when compared with that of reference motor 5, there is no output from differential selsyn 4. However, in the event the housing is accelerated or decelerated for any reason, an error signal is generated which causes an amplifier 6 to produce a signal that varies in phase and amplitude in accordance with the error signal. The amplifier signal is applied directly to energize the normally unenergized control windings of the normally ineffective control motor 1 whereby the motor is turned in the required direction and at the required speed to restore the housing to its prescribed speed and thereby wipe out the error signal. The differential selsyn 4 and amplifier 6 constitute a means for comparing the rotational speed of the object or housing 48 with the rotational speed of the reference device or motor 5 that provides an output with departure of the object from synchronous speed.

From the foregoing it is apparent that the present invention not only provides a means to extend the usable speed-torque range of a servo motor system but also defines a system in which the steady-state velocity error is zero since, under this condition, no error exists in the system and there is no output from the servo motor amplifier. In addition, since the basic speed bias is obtained from the drive motor which is powered from a non-premium source, the controlled power requirements and, therefore, the size of the control motor and its amplifier are substantially less than would be required in a conventional single motor system. Finally, higher rates of acceleration may be obtained because only the relatively small control motor is accelerated. The latter feature is particularly important during sector scanning operations in that reversing torques at the ends of the sector scan motion are not subject to delays in the servo system (i.e., time for error voltage to be built up and amplifier delays) but can be had almost immediately by reversing the drive motor on the line.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. A servo system for rotating an object synchronously with an independent rotational reference device comprising a differential having an output connected to rotate the object and two inputs, a reversible, variable speed, control motor for the system having a normally unenergized stator and a rotor connected to one of the inputs of the differential, means for providing viscous drag between the stator and rotor of the control motor, a unidirectional, constant speed, drive motor for the system of the same rating as the control motor connected to the other input of the differential and normally operating through the differential to rotate the object at synchronous speed and rotate the rotor of the control motor in reverse against the drag effect thereon of said viscous drag means, means for comparing the rotational speed of the object with the rotational speed of the reference device providing an output with departure of the object from synchronous speed, and means for energizing said control motor in accordance with the output of said comparing means to restore the object to synchronism with the reference device.

2. A servo system for rotating an object synchronously with an independent rotational reference device comprising a differential having an output connected to rotate the objects and two inputs, a reversible, variable speed, control motor for the system having a normally unenergized stator and rotor immersed in oil to provide viscous drag, means connecting the rotor of the control motor and one of the inputs of the differential, a unidirectional, constant speed, drive motor for the system of the same rating as the control motor connected to the other input of the differential and normally operating through the differential to rotate the object at synchronous speed and rotate the rotor of the control motor in reverse against the viscous drag of the oil, means for comparing the rotational speed of the object with the rotational speed of the reference device providing an output with departure of the object from synchronous speed, and means for energizing said control motor in accordance with the output of said comparing means to restore the object to synchronism with the reference device.

3. A servo system for rotating an object synchronously with an independent rotational reference device comprising a differential having an output connected to rotate the object and two inputs, a normally ineffective, reversible, control motor for the system having a rotor connected to one of the inputs of the differential, means providing viscous drag for the rotor of the control motor, a unidirectional, constant speed, drive motor for the system of the same rating as the control motor connected to the other input of the differential and normally operating through the differential to rotate the object at synchronous speed and the rotor of the control motor against the drag effect thereon of said viscous drag means, means for comparing the rotational speed of the object with the rotational speed of the reference device providing an output with departure of the object from synchronous speed, and means for rendering said control motor effective in accordance with the output of said comparing means to restore the object to synchronism with the reference device.

4. A servo system for rotating an object synchronously with an independent rotational reference device comprising a differential having an output connected to rotate the object and two inputs, a reversible control motor for the system having a normally unenergized stator and a rotor connected to one of the inputs of the differential, means for providing viscous drag for the rotor of the control motor, a unidirectional, constant speed, drive motor for the system connected to the other input of the differential and normally operating through the differential to rotate the object at synchronous speed and the rotor of the control motor against the drag effect thereon of said viscous drag means, means for comparing the rotational speed of the object with the rotational speed of the reference device providing an output with departure of the object from synchronous speed, and means for energizing said control motor in accordance with the output of said comparing means to restore the object to synchronism with the reference device.

References Cited by the Examiner

UNITED STATES PATENTS

| 1,299,509 | 4/19 | Rey | 318—8 X |
| 2,416,223 | 2/47 | Sanders | 343—7 |
| 2,433,194 | 12/47 | Bedford et al. | 318—8 |
| 2,444,171 | 6/48 | Sanders | 318—13 X |

ORIS L. RADER, *Primary Examiner.*

NORMAN H. EVANS, *Examiner.*